United States Patent [19]

Wijffels et al.

[11] 4,229,418

[45] Oct. 21, 1980

[54] APPARATUS FOR THE CATALYTIC TREATMENT OF HYDROCARBONS

[75] Inventors: Joannes B. Wijffels; Abraham A. Pegels; Arnold Wezenberg, all of The Hague, Netherlands

[73] Assignee: Shell Oil Company, Houston, Tex.

[21] Appl. No.: 948,353

[22] Filed: Oct. 3, 1978

[30] Foreign Application Priority Data

Oct. 7, 1977 [NL] Netherlands ............... 7711019

[51] Int. Cl.³ ............... B01D 39/00; B01J 8/04
[52] U.S. Cl. ............... 422/191; 261/97; 422/195; 422/200; 422/220; 422/213; 55/517; 55/518; 55/515
[58] Field of Search ............... 422/195, 191, 142, 200, 422/144, 216; 261/94, 97, 98; 55/515–519, 487

[56] References Cited

U.S. PATENT DOCUMENTS

| 2,672,407 | 3/1954 | Leffer | 422/216 X |
|---|---|---|---|
| 2,785,961 | 3/1957 | Carter | 422/200 |
| 3,090,667 | 5/1963 | Connellan | 422/216 X |
| 3,489,529 | 1/1970 | Dudych et al. | 422/191 |
| 3,607,000 | 9/1971 | Beal et al. | 208/216 |
| 3,715,193 | 2/1973 | Strelzoff | 422/202 |
| 3,966,420 | 6/1976 | Pegels et al. | 422/191 |

*Primary Examiner*—Michael S. Marcus
*Attorney, Agent, or Firm*—Ronald R. Reper

[57] ABSTRACT

Apparatus for catalytic processes such as desulphurization of hydrocarbons comprises an upright reactor vessel containing at least one tray, and catalytic support means for one or more catalyst beds said support means are attached to the inner wall of the reactor and having filter units attached to render them permeable to fluids and impermeable to catalyst particles; located beneath each supporting means is a fluid permeable tray which is impermeable to catalyst particles and located beneath each tray at least one filter unit of equal or coarser filtering effect than the filter units attached to said supporting means, to prevent access of the catalyst particles to the underside of said tray.

5 Claims, 1 Drawing Figure

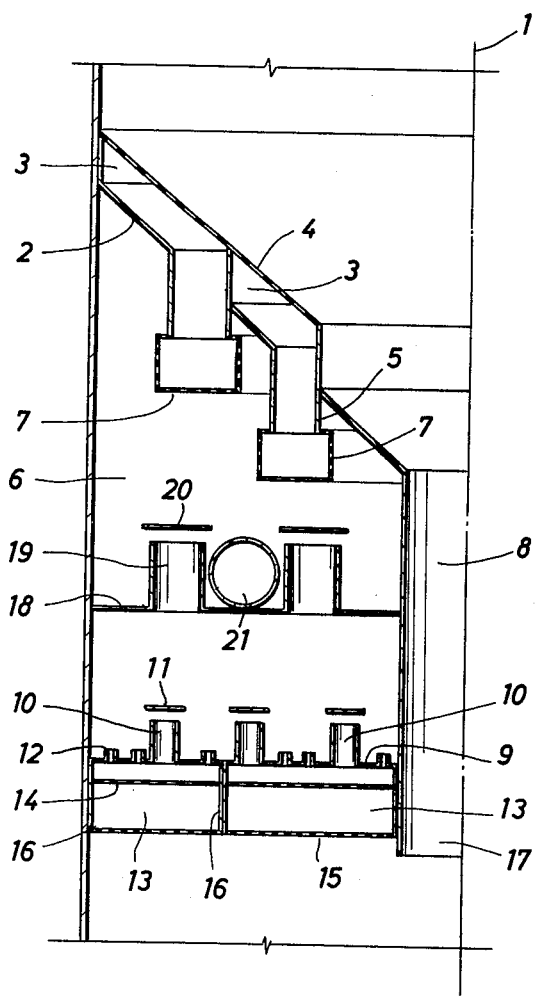

APPARATUS FOR THE CATALYTIC TREATMENT OF HYDROCARBONS

BACKGROUND OF THE INVENTION

The present invention relates to an apparatus for the catalytic treatment of hydrocarbons, and particularly the catalytic desulphurization and demetallization of petroleum residues. A wide variety of catalytic reactors are known; see e.g., U.S. Pat. No. 3,309,305, U.S. Pat. No. 3,607,000, U.S. Pat. No. 3,702,238 and UK Pat. No. 1,253,011.

A reactor of particular interest is described in U.S. Pat. No. 3,966,420, incorporated herein by reference, which reactor is very suitable for processes in which the catalyst must be replaced relatively frequently, since the catalyst present in a reactor of this type can be removed therefrom quickly without dismantling and reassembly of the catalyst bed supporting means and without personnel having to work in the reactor.

SUMMARY OF THE INVENTION

The invention provides an apparatus suitable for catalytic desulphurization and demetallization of petroleum residues consisting of a reactor which contains at least one tray as well as supporting means for one or more catalyst beds, which supporting means are permeable to liquid and gas and impermeable to catalyst particles and in which the supporting means have at least partly the shape of a conical surface of a truncated cone and which supporting means are attached to the reactor wall and have at least one downward-directed opening which is permeable to catalyst particles and in which under each supporting means a tray is located which is permeable to liquid, gas and catalyst particles, which tray has one or more openings being in open communication with the aforementioned opening(s) in the supporting means and situated at least partly vertically under the latter opening(s), the impermeability of the supporting means to the catalyst particles being obtained by means of filter units attached on, in or to the supporting means, and access of the catalyst particles to the underside of the said tray(s), with the exception of the said opening(s) therein, being prevented by means of filter units provided under the tray(s).

DESCRIPTION OF THE DRAWING

The FIGURE is a diagrammatic longitudinal cross-section of a part of a reactor according to the invention.

DESCRIPTION OF PREFERRED EMBODIMENTS

The supporting means may be in the shape of interconnected cylinders and/or surfaces of truncated or non-truncated cones of which the descriptive lines are at different angles to the axis of the reactor. The supporting means of each catalyst bed very suitably consists of a conical surface of a single truncated cone of which the downward-directed opening, permeable to catalyst particles, which is usually carried out in a cylinder, is then situated centrally in the reactor.

The supporting means of a catalyst bed can also consist of a truncated cone in the center of which a non-truncated cone is present, thus forming an central opening which is permeable to catalyst particles.

The acute angle formed by a (the) descriptive line(s) of the conical surface(s) and the axis of the reactor is very suitably 15°–50°.

The supporting means must be so designed that they are permeable to liquid and gas but impermeable to catalyst particles, so that the space between the supporting means and the tray underneath remains free of catalyst particles. Moreover, it must be ensured that the permeability to liquid and gas is not impeded, i.e., it must be prevented that catalyst particles clog the passages. To this end suitable filter units must be attached on, to or in these conical surfaces.

The conical surface(s) is (are), for example, manufactured of perforated plate with round or oblong openings. The conical surface may also be a grid build up of groups of rods, all the rods in each group running parallel to one another and in addition parallel to a descriptive line of the conical surface.

If the chosen design is ineffective as a filter unit to prevent clogging, one or more layers of essentially spherical bodies (also referred to hereinafter as balls) are suitably placed on the conical surfaces. Since the conical surfaces are not horizontal, it is necessary, in order to keep the balls stationary, to place the balls in closed troughs of at least partly perforated plate, which troughs are permeable to liquid, gas and catalyst particles but not to the said balls.

The top of the trough preferably runs parallel to the conical supporting means, so that unloading of the catalyst can be performed in the normal manner, i.e., by gravity. The entire bottom of the troughs may also be parallel to the supporting means or consist thereof, but said bottom may also be designed in such a way that pipes are locally present which extend beyond the supporting means and which are provided with perforated plate at their ends, in order to confine the balls in the trough. The said troughs filled with balls act as filter units and ensure that the supporting means are impermeable to catalyst particles.

By spherical bodies are meant bodies which are entirely or substantially spherical. It is obvious that bodies will always occur which deviate to some extent from the spherical shape and have for example an elliptical cross-section, either by fracture or by deviations caused during manufacture. The balls consist very suitably of ceramic material.

It will be clear that the diameter of the balls must always be larger than that of the catalyst particles, because the balls are confined in the troughs while the catalyst particles can enter them.

Any tray under the supporting means can very suitably be of the usual type, for example a sieve tray made of perforated plate and having a circular circumference which is attached thereby to the wall of the reactor. Preferably, the trays are also provided with devices for passing gas or vapor, for example one or more cylinders or troughs arranged on the tray, at which area the tray is permeable to gas, liquid and catalyst particles. Preferably, the upper part of such a cylinder or trough is provided with an impermeable plate parallel to the plane of the distribution tray, in such a manner that the gas or vapor can flow through between the plate and the upper edge of the cylinder or trough.

Loading of the reactor with catalyst is very suitably performed by introducing the catalyst as a slurry in, for example, an oil from the top of the reactor and by supplying a carrier liquid (very conveniently consisting of the same oil) from the bottom into the reactor at such a rate that the catalyst settles. As described in the Netherlands patent application No. 7413636 it is also possible to bring the catalyst particles into a state of "incipient fluidization", after which the catalyst particles are allowed to settle.

The reactor is preferably loaded with catalyst particles, the dimensions of which vary between narrow limits and which can be obtained as described in the above-mentioned Netherlands patent application No. 7413636.

If no precautions are taken during loading, catalyst particles will move through the tray under the supporting means toward the space between the tray and the supporting means, which is undesirable since such particles are difficult to remove from the space and moreover this space is usually used to cool the hydrocarbons flowing through during operation (by which is understood the catalytic treatment of hydrocarbons). Moreover, cylinders arranged on the trays are filled with catalyst particles, which may result in an unacceptably high pressure drop during operation.

In order to ensure that no catalyst particles reach undesirable places in or above the tray, the bottom of the tray is screened with filter units impermeable to catalyst particles, such as perforated plate, grids build up of groups of rods and in particular troughs filled with balls.

It has now been found that a good operation of the process is only possible, and that no undesirable pressure drop across the reactor occurs, if the latter filter units have the same or a coarser filtering effect than the filter units which are attached on, to or in the conical surfaces.

The invention therefore relates to an apparatus for the catalytic treatment of hydrocarbons, in particular catalytic desulphurization and demetallization of petroleum residues, consisting of a reactor which contains at least one tray as well as supporting means for one or more catalyst beds, which supporting means are permeable to liquid and gas and impermeable to catalyst particles and in which the supporting means are at least partly in the shape of a conical surface of a truncated cone and which supporting means are attached to the wall of the reactor and are provided with at least one downward-directed opening permeable to catalyst particles and in which under each supporting means a tray is located which is permeable to liquid, gas and catalyst particles, which tray has one or more openings being in open communication with the above-mentioned opening(s) in the supporting means and situated at least partly vertically under the latter opening(s), the impermeability of the supporting means to the catalyst particles being obtained by means of filter units attached on, in or to the supporting means and the access of the catalyst particles to the underside of the said tray(s), with the exception of the said openings therein, being prevented by means of filter units arranged under the tray(s), which apparatus is characterized in that the latter filter units are so designed that they have the same or a coarser filtering effect than the former filter units.

A filter unit has a coarser filtering effect than another filter unit if any particle passing the latter filter unit is also capable of passing the former filter unit.

In this manner it is ensured that small particles passing the filter units attached on, to or in the supporting means during operation cannot result in clogging of the filter units underneath the trays. These small particles may consist of mechanical impurities present in the oil to be treated and/or of broken or pulverized catalyst particles which may be formed in the reactor during operation while the oil to be treated flows from the top to the bottom of the reactor.

It is of advantage that the filter units attached on, to or in the supporting means and the filter units arranged under the trays are of the same type, for example that both consist of perforated plate or of grids built up of groups or rods or, preferably, of ball-filled troughs of which the walls are permeable to liquid, gas and catalyst particles but not to the balls.

The troughs must preferably be attached in such a way that the underside of a tray can only be reached by rising liquid that has passed at least one trough situated under the relevant tray. During loading of the reactor with catalyst, part of the liquid will move upwards through the opening(s) in the tray which is/are in open communication with the opening(s) in the supporting means without passing a trough and it is undesirable that this liquid, which may contain catalyst particles, reaches the underside of a tray. The opening(s) in the tray is/are very suitably provided with a downward-directed pipe having a wall which is impermeable to liquid, to which wall the trough(s) is/are attached.

The balls must fill the troughs under each tray completely, i.e., the balls must not move during the passage of the oil. If the balls are capable of moving, their filtering effect will decrease substantially and catalyst particles can nevertheless reach the tray above the troughs.

The bottoms and tops of the troughs consist very suitably of perforated plate which may be provided, for example, with slots of about 4 by about 15 mm.

The dimensions of the openings in the tops and bottoms of the troughs are not very critical, provided that the balls cannot pass and the catalyst particles can.

A trough can be filled with balls of different diameters.

In order to ensure that the ball-filled troughs arranged under the tray have a coarser filtering effect than the ball-filled troughs attached on, to or in the supporting means, the diameter of the balls present in the former troughs is at least equal to and preferably larger than the diameter of the smallest balls present in the trough(s) attached on, to or in the supporting means situated above them.

If the apparatus is intended for use in the hydrodesulphurization or demetallization of heavy hydrocarbon oils, for example residues, the catalyst very suitably consists of extrudates having a diameter of 0.5–3 mm and a length of 3–7 mm, although it is of course also possible to use other forms, for example, spherical particles having a diameter of 0.5–4 mm, as catalyst particles.

The diameter of the balls in the troughs is very suitably 4–10 mm, depending on the size of the catalyst particles.

It has been found that the catalyst particles are substantially completely retained by the troughs filled with balls, if all the balls have about the same diameter and the distance from the bottom to the top of a trough is about 2 to about 5 times the diameter of the balls. Care should be taken to keep the troughs as small as possible, on the one hand since the ball-filled troughs occupy reactor volume without supplying catalytic activity during operation, and on the other hand to keep the weight of the troughs as low as possible since this will facilitate their attachment in the reactor.

The invention will be illustrated with reference to the drawing which shows a diagrammatic preferred embodiment of an apparatus according to the invention and which a longitudinal cross-section of part of the reactor of which 1 is the center line. The supporting means 2 accommodate troughs 3, the top walls of which consist of plate 4 perforated with slotted openings, which plate is permeable to catalyst particles consisting in this case of extrudates having a diameter of 1.5 mm. With connecting channels 5 the troughs extend into the space 6 under the supporting means and in this space they are defined at the underside and on the sides by perforated plate 7. The troughs are filled with layers of ceramic balls of different dimensions having diameters of 5, 12 and 24 mm from top to bottom. The supporting means 2 are provided with an opening 8 which is permeable to the catalyst particles. A tray 9 is attached under the supporting means and the opening 10 of this tray is in direct communication with opening 8. Tray 9 is provided with cylinders 10 for gas transport, above which horizontal plates 11 are arranged. The diameter of cylinders 10 is larger than the diameter of the catalyst particles. Tray 9 is further provided with liquid passages 12. Troughs 13, which are completely filled with balls having a diameter of 6 mm, are suspended under tray 9. Troughs 13 have a top wall 14 and a bottom 15 of plate perforated with slots. The distance between top wall 14 and bottom 15 is 18 mm. The side walls 16 of troughs 13 are impermeable to gas and liquid and so attached with respect to the reactor wall, each other and pipe 17 reach tray 9 from the underside without having passed a trough 13.

In space 6 is a device for cooling the liquid flowing through this space during operation, which device consists of a tray 18 on which are situated cylinders 19 (covered with plates 20), the walls of which are impermeable to liquid and gas. During operation the liquid will accumulate between these cylinders and can be cooled locally by means of cooling devices 21 which may consist of lines through which a cold liquid is pumped or cold gas is injected. Tray 18 and the appertaining cylinders 19 and plates 20 and cooling devices 21 are not essential to an apparatus according to the invention.

What is claimed is:

1. An upright apparatus for the catalytic treatment of hydrocarbons comprising a reactor containing at least two tray means, and containing catalyst supporting means for at least one catalyst bed, said supporting means being permeable to liquid and gas and impermeable to catalyst particles, said supporting means being attached to the inner wall of the reactor and being at least partly in the shape of a conical surface of a truncated cone converging downwardly to an aperture permeable to catalyst particles; said reactor having at least one supporting means-filter unit attached to said supporting means to obtain impermeability of the supporting means to the catalyst particles; disposed beneath each said supporting means is a first cooling tray means, impermeable to liquid and gas, for cooling liquid accumulated on said cooling tray means during catalytic hydrotreatment of hydrocarbons, said cooling tray means having an aperture permeable to catalyst particles, and a plurality of walled apertures permeable to liquid and gas, each of said walled apertures having upright cylindrical walls protruding above said cooling tray means for accumulating liquid on the upper surface of said cooling tray means, and spaced above each said walled aperture is a liquid impermeable cover plate for preventing direct bypassing of liquid between said supporting means and a second, hereafter described distribution tray means; disposed on said cooling tray means is at least one cooling conduit, adapted to be connected to a source of cooling fluid, for cooling liquid accumulated on said cooling tray means; located beneath each said cooling tray means is a second, distribution tray means which is permeable to liquid and gas, for effecting redistribution of liquid flowing out of the catalyst bed and impermeable to the catalyst particles and having an aperture permeable to catalyst particles; and at least one distribution tray means filter unit disposed underneath said distribution tray means to prevent access of catalyst particles to the underside of said distribution tray means, said distribution tray means filter unit having the same or coarser filtering effect than said supporting means filter unit.

2. Apparatus as in claim 1 wherein said supporting means-filter units and said tray means-filter units consist of ball-filled troughs of which the top walls and the bottoms are permeable to liquid, gas and catalyst particles, but not to the balls.

3. Apparatus as in claim 2 wherein all the balls in said tray means-filter unit have about the same diameter and that the distance from the bottom to the top of said tray means-filter unit is about 2 to 5 times the diameter of the balls.

4. Apparatus as in claim 2, wherein said tray means-filter unit is disposed under said tray means such that the underside of the tray can only be reached by rising liquid that has passed through at least one said tray means-filter unit situated under the relevant tray.

5. Apparatus as in claim 1 wherein said supporting means-filter units and said tray means-filter units each comprise as filter media one or more layers of essentially spherical bodies.

* * * * *